United States Patent [19]
Makino et al.

[11] Patent Number: 6,100,017
[45] Date of Patent: Aug. 8, 2000

[54] ROLL PHOTO FILM HAVING SEAL TAPE

[75] Inventors: Teruyoshi Makino; Toshiyuki Takeya, both of Kanagawa, Japan

[73] Assignee: Fuji Photo Film Co. Ltd., Kanagawa, Japan

[21] Appl. No.: 09/257,261

[22] Filed: Feb. 25, 1999

[30] Foreign Application Priority Data

Mar. 25, 1998 [JP] Japan .................................. 10-077372
Mar. 25, 1998 [JP] Japan .................................. 10-077373

[51] Int. Cl.⁷ .............................. G03C 3/02; G03C 3/00; B65D 85/38; B65D 85/67
[52] U.S. Cl. ...................... 430/501; 242/348.4; 206/411; 206/316.1; 206/455
[58] Field of Search ................................ 206/411, 316.1, 206/395, 410, 455; 242/348.4; 430/501

[56] References Cited

U.S. PATENT DOCUMENTS 1,372,593  3/1921  Blackett ................................. 430/501

FOREIGN PATENT DOCUMENTS 2-235051   9/1990  Japan ................................ G03C 3/02
5-47944    6/1993  Japan ................................ G03C 3/02
10-104803  4/1998  Japan ................................ G03C 3/02

*Primary Examiner*—Mark F. Huff
*Attorney, Agent, or Firm*—Sughrue, Mion, Zinn, Macpeak & Seas, PLLC

[57] ABSTRACT

A 120-type roll photo film has a photo filmstrip. Trailer and leader portions of backing paper project from respective ends of the photo filmstrip. The photo filmstrip is wound about a spool with the trailer and leader portions. A seal tape is previously secured to the trailer portion.

The photo filmstrip, after being exposed, is wound with the trailer and leader portions in a form of a roll with the leader portion internally positioned. Then the seal tape is fitted on the roll for preventing the trailer portion from being unwound. In the seal tape, a support material has first and second ends and an intermediate portion. The support material is folded into three in a Z-shape along first and second fold lines located between the intermediate portion and each of the first and second ends. A first adhesive layer attaches the first end to the trailer portion. An auxiliary adhesive layer attaches the intermediate portion to the first end in a peelable manner. A second adhesive layer is overlaid on the second end, and confronts the intermediate portion. A release layer is overlaid on the intermediate portion, receives the second adhesive layer, and facilitates peeling of the second adhesive layer from the intermediate portion. When the second end is separated from the intermediate portion, the support material is unfolded. The second adhesive layer attaches the second end to the trailer portion.

26 Claims, 11 Drawing Sheets

ROLL PHOTO FILM HAVING SEAL TAPE

BACKGROUND OF THE INVENTION

1. Field of the Invention

The present invention relates to a roll photo film. More particularly, the present invention relates to a roll photo film in which a seal tape or fastening tape associated with a trailer can be used effectively without inconvenience for keeping a roll of the photo film wound tightly.

2. Description Related to the Prior Art

A Brownie photo film of the 120 type is known as a roll photo film in the field of photosensitive material, and includes a photo filmstrip, which is approximately 6 cm wide. Light-shielding backing paper is fitted on a back surface of the photo filmstrip, to be wound together about a spool in a form of a roll. A leader end of the backing paper is provided with a seal tape or fastening tape of paper, which adheres to the roll to keep it wound. When the roll photo film is used, at first a take-up spool is set in a photo film take-up chamber of a camera. The take-up spool is derived from a previously used roll photo film of which a previous photo filmstrip is removed, and of course has the same shape as the spool in the roll photo film newly to be used.

A photo film supply chamber of the camera is loaded with the roll photo film. Then the seal tape is removed from the backing paper, of which the leader end is inserted in a slit in the take-up spool in the photo film take-up chamber. The camera is manually operated for winding a portion of the backing paper about the spool by a predetermined amount. An arrow indicia printed on the surface of the backing paper becomes set at a start indicia positioned in the camera. Upon this, the winding operation is stopped. A back lid of the camera is closed. The roll photo film is wound further until a first frame set at an exposure aperture. A photo film counter indicates a numeral "1" representing setting of the first frame. Then the roll photo film is kept positioned without movement, to be ready for taking an exposure.

In the course of taking exposures, an exposed portion of the photo film with the backing paper is wound on the take-up spool in the photo film take-up chamber. After all the exposures are taken, the roll photo film is wound further. A trailer portion of the backing paper is disengaged from the spool in the photo film supply chamber before the entirety of the photo filmstrip and the backing paper is wound about the take-up spool in the photo film take-up chamber. Then the back lid of the camera is opened. A user manually takes the roll photo film out of the photo film take-up chamber while his or her fingers tightly holds the backing paper.

The roll photo film has another seal tape, of which one end is attached to a trailer end of the backing paper. A coating of adhesive agent is applied to the inside surface of a remaining end of the seal tape. The adhesive agent has such a characteristic that it is activated when moistened. A user moistens the seal tape with his or her tongue, and presses the seal tape against the backing paper, so that the roll of the roll photo film can be fastened without loosening the backing paper.

But it is likely that a certain photographer uses a great number of roll photo films. He or she must moisten the adhesive agent of the seal tape many times with his or her saliva, and is likely to feel ill as his or her tongue senses the adhesive agent. Also the use of the adhesive agent to be moistened by users is not acceptable in a sanitary point of view. Manufacturers shipping products should be responsible for preventing products from harming users, which is relevant to provisions of the recently enacted PL Law concerning responsibility for products. In such a situation, there is a suggestion in JP-U 5-47944 that release paper is used with the seal tape as a sticker, and that the seal tape is peeled from the release paper before being attached for the fastening.

The roll photo film disclosed in this document has a problem in that the seal tape is likely to stick to a photo film pressure plate of the camera particularly if the release paper is dropped away inside the camera. It is difficult to work this construction actually, because the release paper may drop during the photo film winding process in the course of the manufacture of the Brownie photo film. So JP-A 10-104803 (corresponding to Japanese Patent Application No. 8-260792) discloses an alternative structure in which the seal tape is kept bent in a channel shape.

The roll photo film disclosed in this publication also has a problem in that an adhesive surface of the seal tape is dropped away from the release layer when the seal tape passes through a photo film passageway in the camera. This problem occurs typically if the photo film passageway has a great curvature or is narrow.

SUMMARY OF THE INVENTION

In view of the foregoing problems, an object of the present invention is to provide a roll photo film in which a seal tape or fastening tape can be used acceptably in a sanitary point of view without operation of moistening the adhesive agent, and can be prevented from being dropping away while used.

In order to achieve the above and other objects and advantages of this invention, a roll photo film includes a photo filmstrip having a rear end and a front end. A trailer portion and a leader portion are located to project respectively from the rear end and the front end. On a spool, the trailer portion is mounted. The photo filmstrip is wound in a roll form with the trailer portion and the leader portion. A seal tape is previously secured to the trailer portion. The photo filmstrip, after being exposed, is wound with the trailer portion and the leader portion in a form of a roll with the leader portion internally positioned. Then the seal tape is fitted on the roll for preventing the trailer portion from being unwound. In the roll photo film, the seal tape includes a support material, having first and second ends, and an intermediate portion located therebetween. There are first and second fold lines along which the support material is folded into three in a Z-shape or S-shape, the first fold line being disposed between the first end and the intermediate portion, and the second fold line being disposed between the second end and the intermediate portion. A first adhesive layer attaches the first end to the trailer portion. An auxiliary adhesive layer attaches the intermediate portion to the first end in a peelable manner. A second adhesive layer is overlaid on the second end, and confronts the intermediate portion. A release layer is overlaid on the intermediate portion, for receiving the second adhesive layer, to facilitate peeling of the second adhesive layer from the intermediate portion. When the second end is separated from the intermediate portion, the support material is unfolded along the first and second fold lines, and the second adhesive layer attaches the second end to the trailer portion.

In a preferred embodiment, a slit is formed in the spool, for receiving the trailer portion. The spool is uncovered, the leader portion is inserted in the slit, the photo filmstrip, after being exposed, is wound about the spool in the form of the roll with the trailer portion and the leader portion.

The seal tape is located inside the slit while the trailer portion is inserted in the slit.

The first end is disposed opposite to the photo film-strip with reference to the support material, and the support material has a length predetermined according to a length of an outermost turn of the roll when unfolded, and is wound about the roll.

An end of the trailer portion is folded back or cut back along a predetermined line before the second end is attached, and the predetermined line is disposed close to the first end.

The release layer includes silicone.

According to another aspect of the present invention, a seal tape includes a support material, having first and second ends disposed opposite to each other with respect to a longitudinal direction of the trailer portion, and an adhesive layer, overlaid on the support material, for attaching the support material to the trailer portion. A release layer is overlaid in a predetermined region on the trailer, the predetermined region confronting an intermediate portion defined on the support material between the first and second ends, the release layer setting the first end separable from the trailer portion by facilitating peeling from the adhesive layer.

In a preferred embodiment, the intermediate portion is disposed nearer to the first end than the second end on the support material.

Furthermore a slit is formed in the spool, for receiving the trailer portion. The spool is uncovered, the leader portion is inserted in the slit, the photo filmstrip, after being exposed, is wound about the spool in the form of the roll with the trailer portion and the leader portion.

The first end is located inside the slit while the trailer portion is inserted in the slit.

The first end is disposed opposite to the photo film-strip with reference to the support material. When the leader portion is mounted on the spool being uncovered and the photo filmstrip is wound about the spool, the first end is separated from the trailer portion, an end of the trailer portion is folded back or cut back in a position at the predetermined region, the support material extends in a manner crosswise to an edge of the trailer portion folded back or cut back, and the first end is attached to the roll by the adhesive layer.

The release layer and the adhesive layer contact each other to be secured to each other with a small peel strength of 100–200 grams per 20 mm.

The release layer is constituted by a release material overlaid on the trailer in a predetermined pattern, and the predetermined pattern includes plural lines arranged substantially in parallel.

In another preferred embodiment, the release layer is constituted by a release material overlaid on the trailer in a predetermined pattern, and the predetermined pattern includes plural lines substantially in parallel with a first direction, and plural lines substantially in parallel with a second direction crosswise to the first direction.

The release layer Iincludes slicone.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENTS OF THE PRESENT INVENTION

Figure 1:
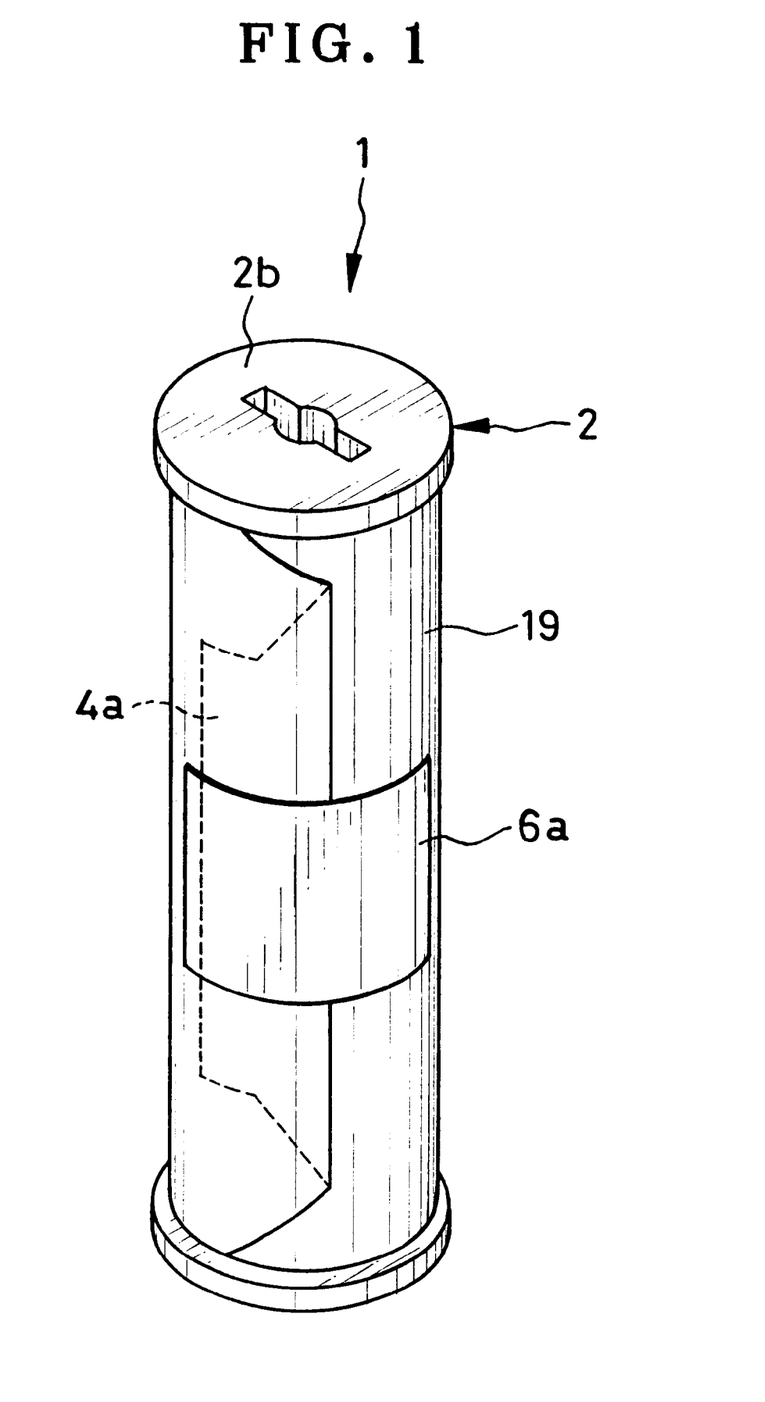
FIG. 1 is a perspective illustrating a roll photo film.

In FIG. 1, a roll photo film 1 of the Brownie type according to the present invention is illustrated. In FIG. 4, a spool 2 is illustrated. The roll photo film 1 is either the 120 or 220 type. The 120 type is constituted by the spool 2 and a paper-backed photo film 19. The spool 2 has a core 2a. The paper-backed photo film 19 consists of a photo filmstrip 3 and light-shielding backing paper 4. For the photo filmstrip 3, see FIGS. 2 and 3. The paper-backed photo film 19 is wound about the core 2a in a roll form. A leader portion 4a is folded partially, and fixed by attachment of a seal tape or fastening tape 6a. A pair of flanges 2b are formed with respective ends of the core 2a.

Figure 2:
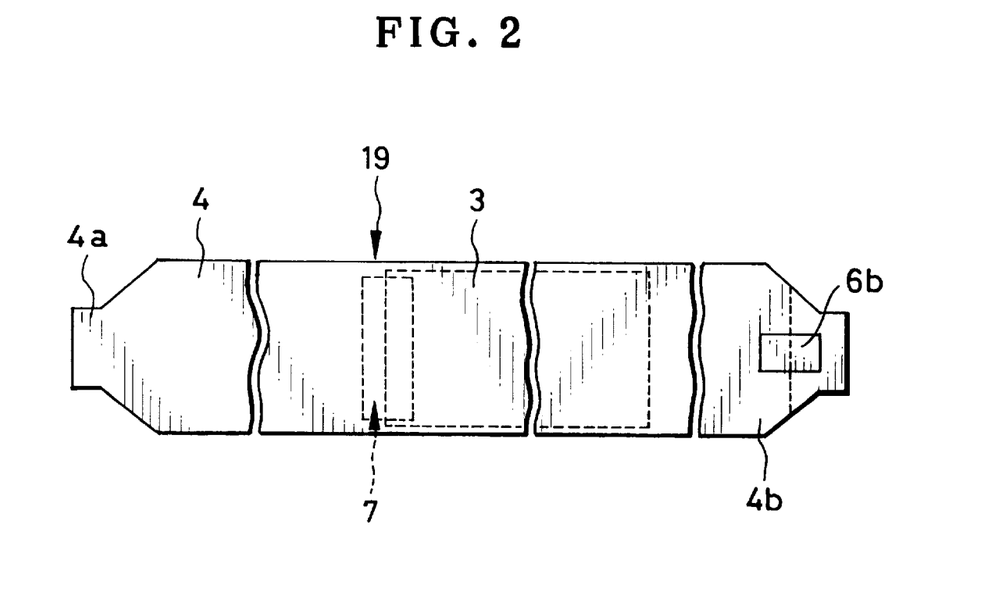
FIG. 2 is a plan illustrating a spread state of the roll photo film of the 120 type.

In FIG. 2, a spread state of the paper-backed photo film 19 of the 120 type is illustrated. To be precise, there are two kinds of the 120 type, including the 120 standard type and the 120 half type. Let the frame size of taking an exposure be the semi size of 41.5×56 mm. The photo film-strip 3 of the 120 standard type has a length enough for 15 or 16 available frames. The photo filmstrip 3 of the 120 half type has a length enough for 7 or 8 available frames. The term 120 type is hereinafter used particularly when no discrimination is required between the 120 standard type and the 120 half type.

The backing paper 4 has a length greater than that of the photo filmstrip 3. Ends of the backing paper 4 are the leader portion 4a and a trailer portion 4b. The seal tape 6a of FIG. 1 is attached to the leader portion 4a. A seal tape or fastening tape 6b is attached to the trailer portion 4b. The photo filmstrip 3 is fitted on the backing paper 4 by directing a back surface of the photo filmstrip 3 to a black back surface of the backing paper 4. A connector tape 7 is disposed on an end of the photo filmstrip 3, and connects the photo filmstrip 3 to the backing paper 4. A bar code is printed on the connector tape 7 to represent information including the ISO photo sensitivity of the photo filmstrip 3 and the like.

Figure 3:
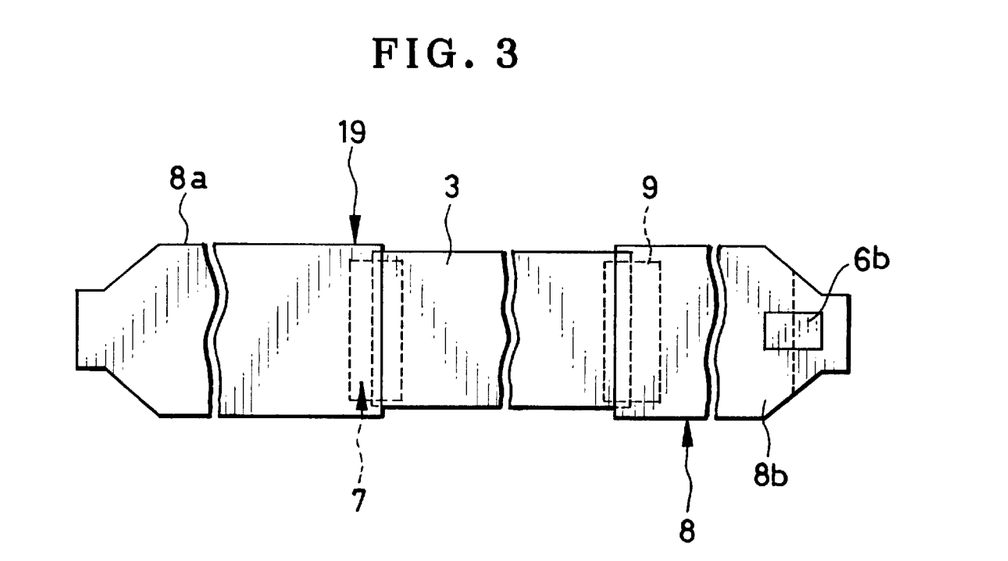
FIG. 3 is a plan illustrating a spread state of the roll photo film of the 220 type.
Figure 4:
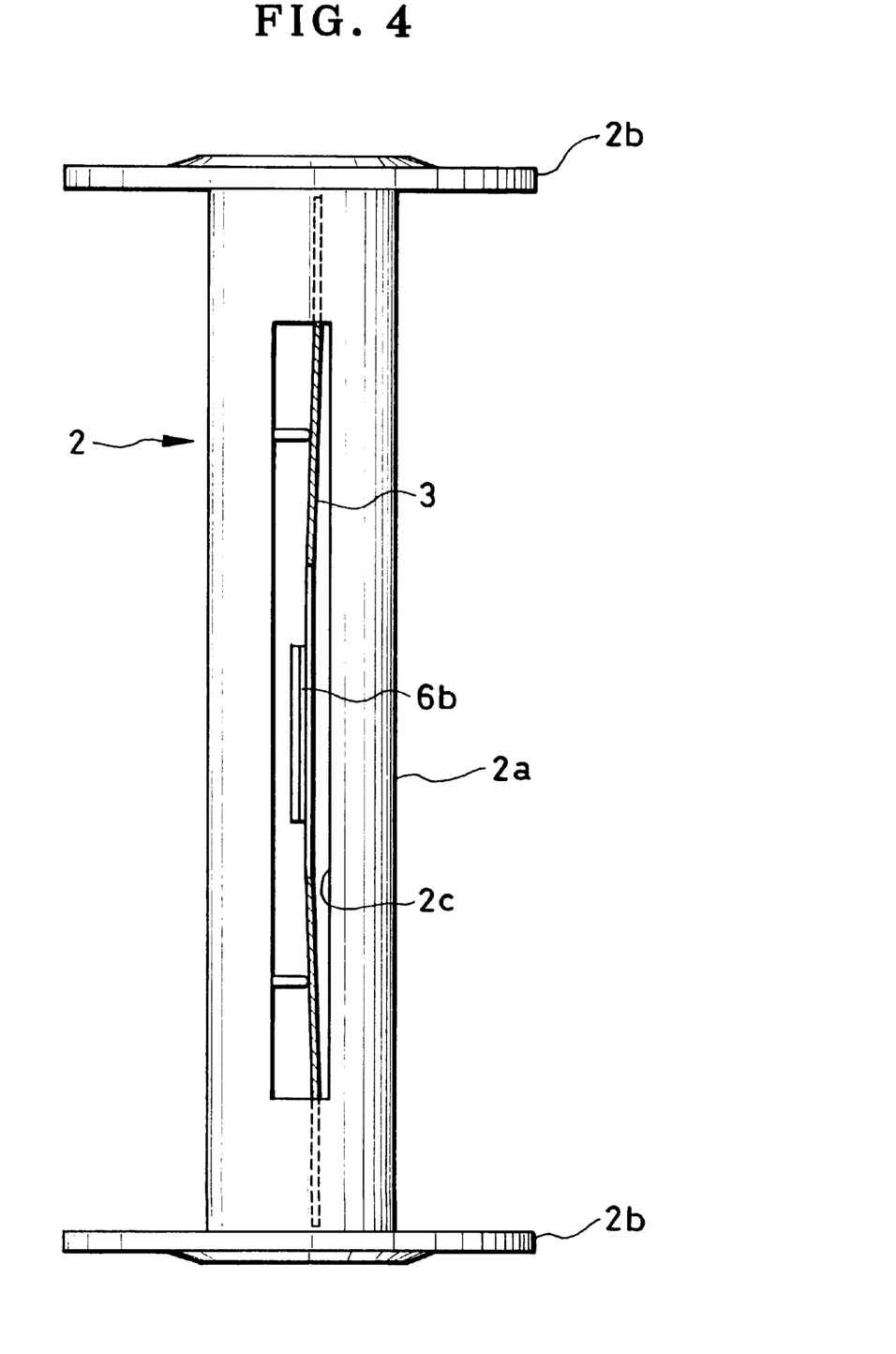
FIG. 4 is a front elevation illustrating a spool of the roll photo film.

In FIG. 3, a spread state of the photo film 19 of the 220 type is illustrated. Light-shielding sheets 8 for the 220 type include a leader sheet 8a and a trailer sheet 8b. The leader sheet 8a is connected to the first end of the photo filmstrip 3 with the connector tape 7. The trailer sheet 8b is connected to the second end of the photo film-strip 3 with a connector tape 9. A bar code is printed on the connector tape 7 for representing sensitivity information or the like.

Also the seal tape 6a is attached to the leader sheet 8a. The seal tape 6b is attached to the trailer sheet 8b. The photo filmstrip 3 of the 220 type has a length approximately two times as great as that of the 120 standard type. If the frame size of each imaging frame is the semi size, the photo filmstrip 3 of the 220 type has 30 available frames.

In the photo film 19, any of the leader and trailer portions 4a and 4b and the leader sheet 8a and the trailer sheet 8b is inserted in a slit 2c in the core 2a of the spool 2 in the manner illustrated in FIG. 4.

Figure 5:
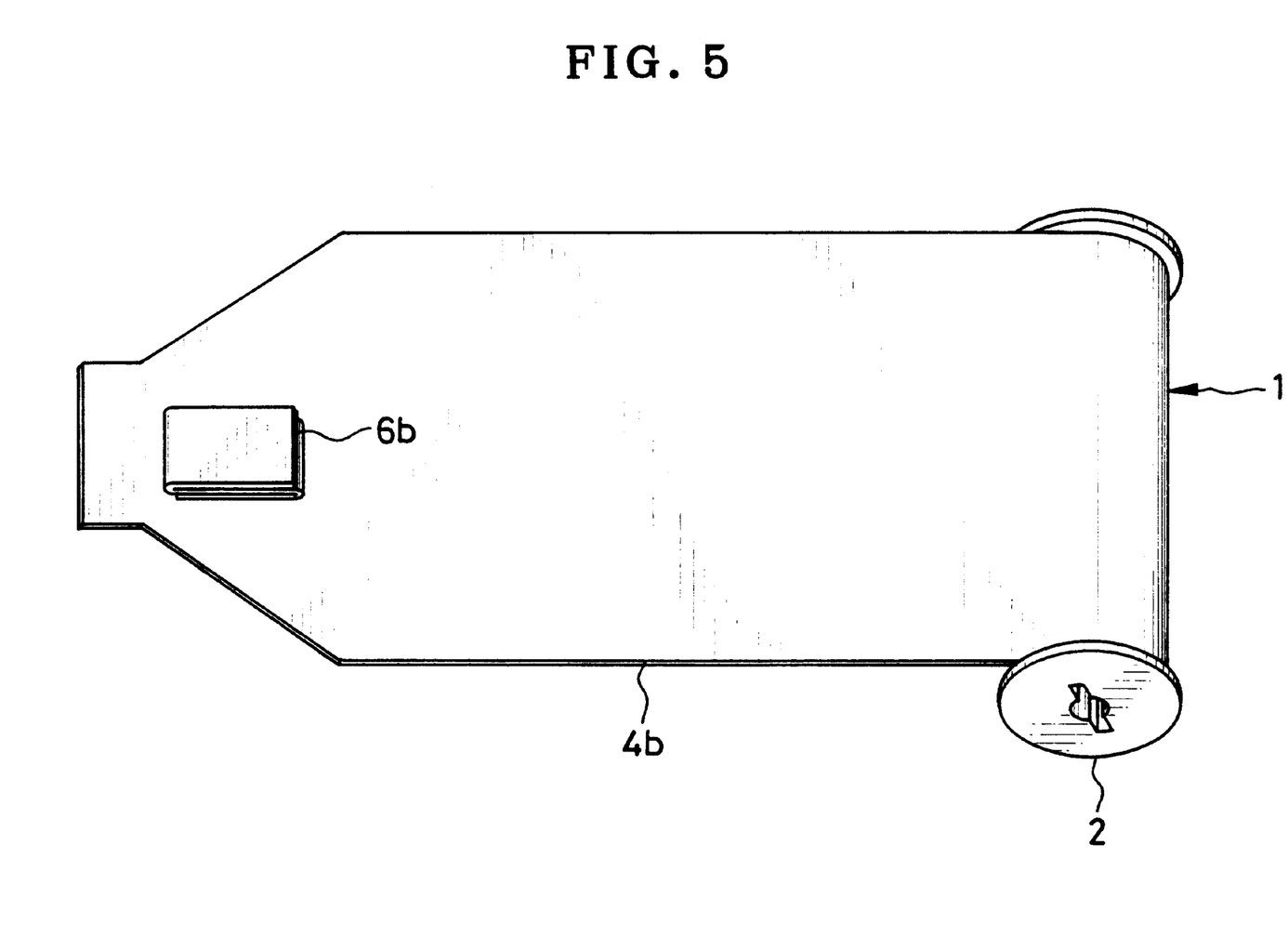
FIG. 5 is a perspective illustrating the roll photo film wound in reverse, in which a seal tape or fastening tape appears on a trailer portion.
Figure 6A:
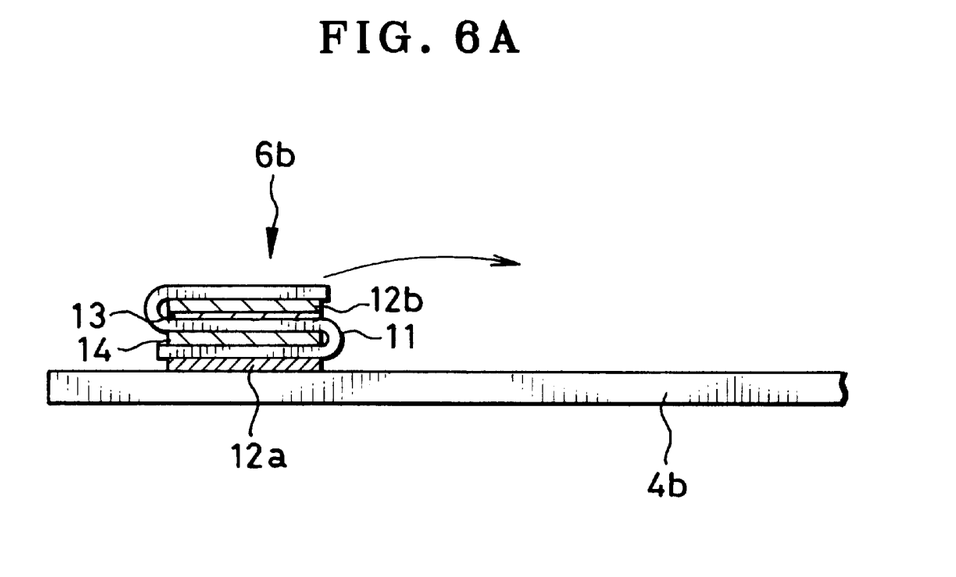
FIG. 6A is an explanatory view in elevation, illustrating the trailer portion with the seal tape.

In FIGS. 5 and 6A, the seal tape 6b is illustrated as located on the trailer portion 4b of the paper-backed photo film 19 wound in reverse after being exposed. The seal tape 6b is previously folded in a Z-shape, and includes support material 11, a first adhesive layer 12a, a second adhesive layer 12b, a release layer 13 and an auxiliary adhesive layer 14. The support material 11 is soft and is formed in a ribbon shape. The first and second adhesive layers 12a and 12b are a coating of adhesive agent having a pressure-sensitive characteristic. The release layer 13 consists of a coating of silicone or the like. The auxiliary adhesive layer 14 consists of a coating of weak adhesive agent, and can be attached in a manner peelable again when pulled. The support material 11 is produced from paper or thin plastic tape. The release layer 13 is so located that, when the seal tape 6b is folded in the Z-shape, the release layer 13 is positioned on the second adhesive layer 12b.

Figure 7:
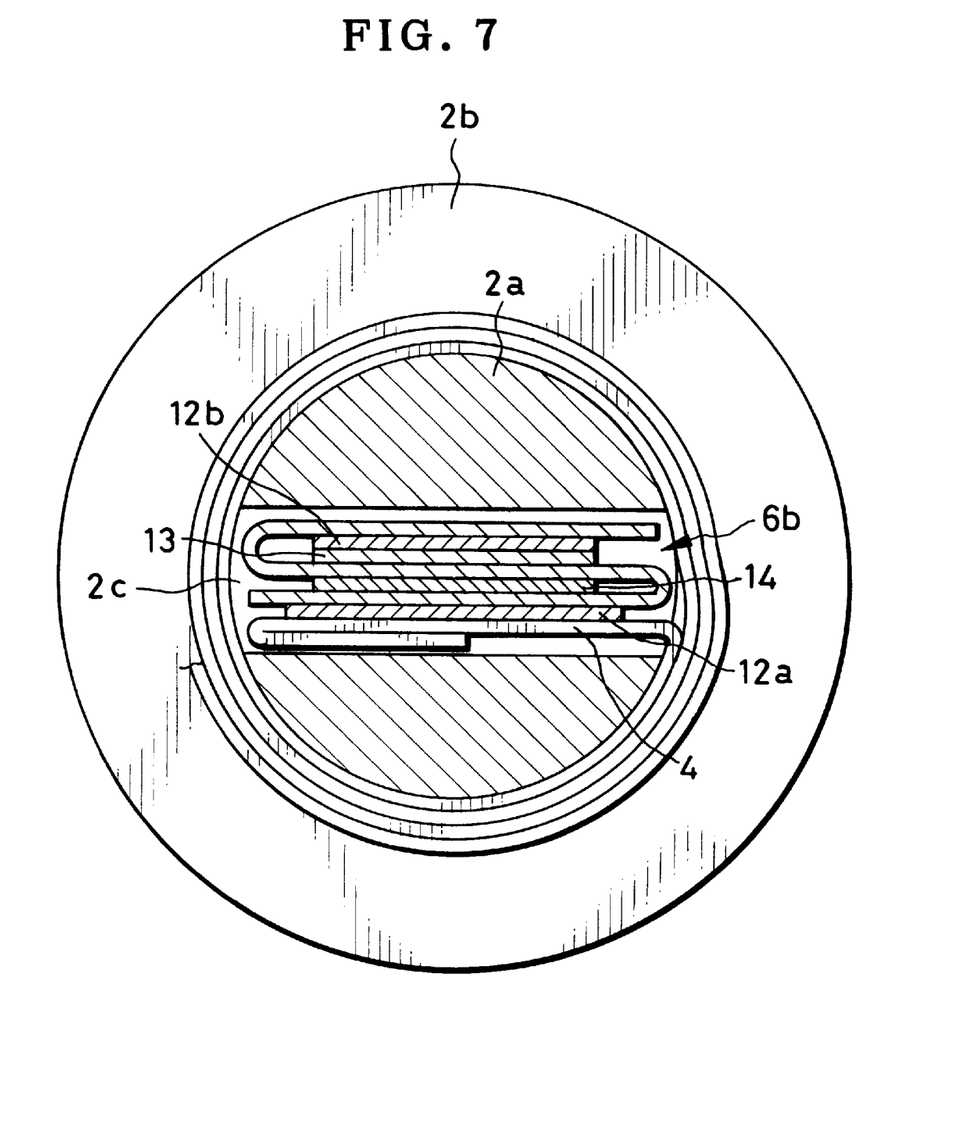
FIG. 7 is a cross section, partially cutaway, illustrating the spool and the seal tape originally positioned inside.

In FIG. 7, nearly the entirety of the seal tape 6b is located inside the slit 2c in the spool 2 initially when the trailer portion 4b of the backing paper 4 is inserted in the slit 2c.

The operation of the above-mentioned construction is described now. In the manufacture of the roll photo film 1, the trailer portion 4b of the backing paper 4 with the seal tape 6b attached thereto is inserted into the slit 2c of the spool 2. Then the spool 2 is rotated to wind the paper-backed photo film 19 on the periphery thereof. The seal tape 6a on the leader portion 4a of the backing paper 4 is fixedly secured to the outside of the roll to prevent the leader portion 4a from being unwound.

Figure 6B:
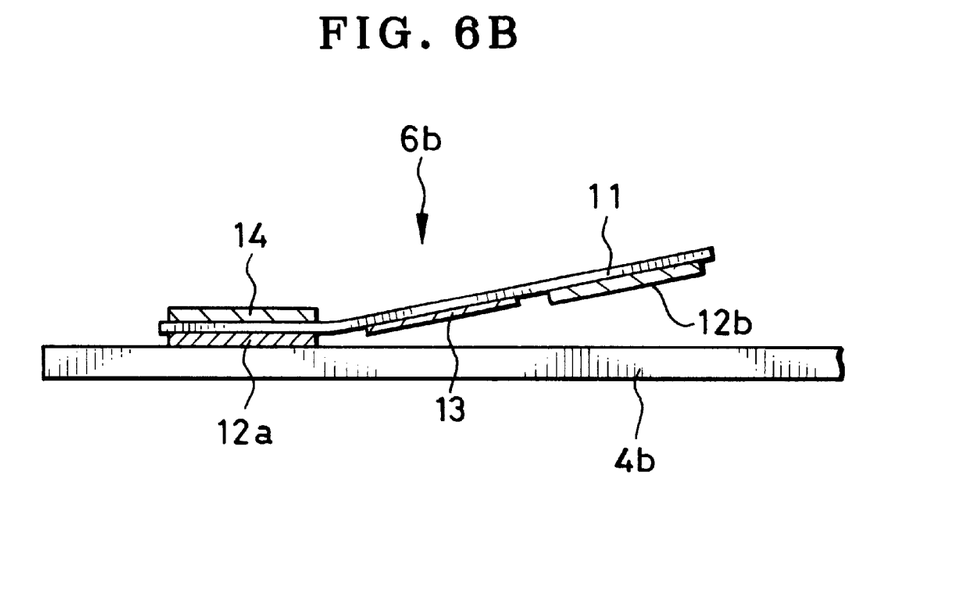
FIG. 6B is an explanatory view in elevation, illustrating a state where the seal tape is extended on the trailer portion.
Figure 6C:
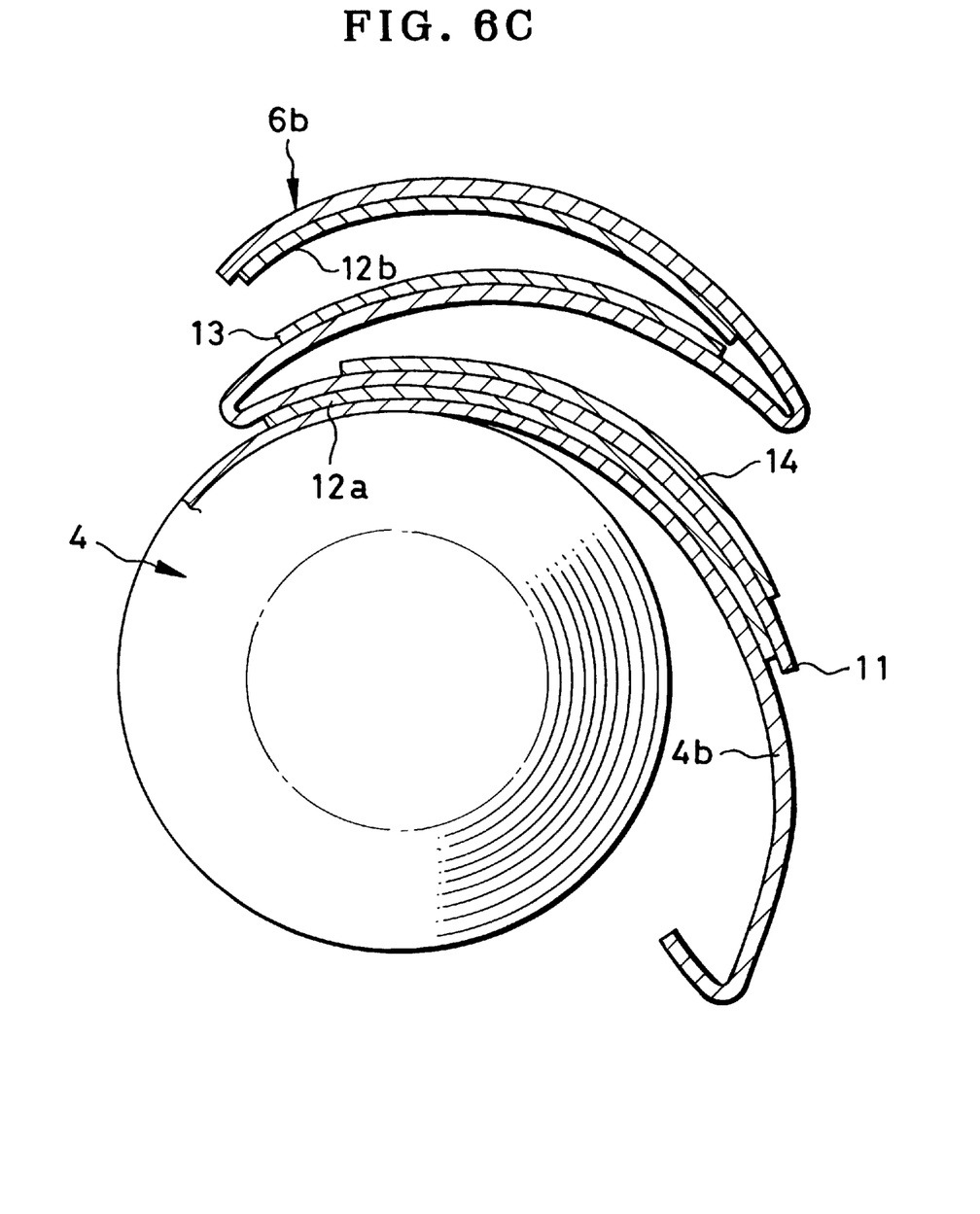
FIG. 6C is an explanatory view in section, illustrating a step of starting unfolding the seal tape.

The seal tape 6b, attached to the trailer portion 4b to be wound in an innermost position about the spool 2, is kept folded in the Z-shape as illustrated in FIG. 6A by means of the auxiliary adhesive layer 14. The trailer portion 4b is likely to flex when wound about a take-up spool shaped equally to the spool 2 as depicted in FIGS. 5 and 6C. But there occurs no peeling between the release layer 13 and the second adhesive layer 12b. The seal tape 6b can be prevented from sticking on the back surface of the first turn of the backing paper 4.

In FIG. 7, the trailer portion 4b of the backing paper 4 is initially entered to the slit 2c of the spool 2. Nearly the entirety of the seal tape 6b is located in the slit 2c in the spool 2. Again it is possible to avoid peeling of an end of the seal tape 6b, and prevent it from being stuck on the back surface of the first turn of the backing paper 4.

Figure 6D:
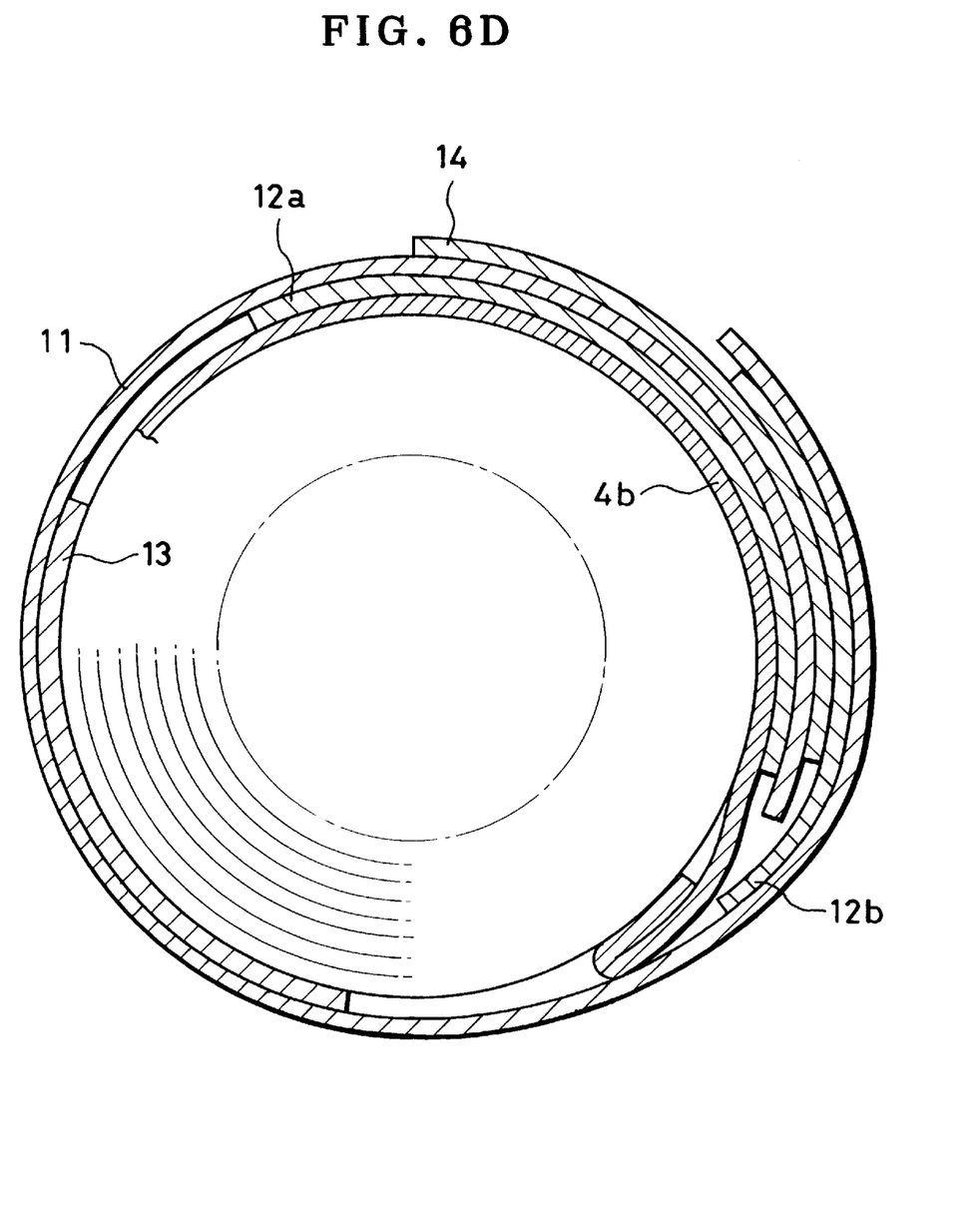
FIG. 6D is an explanatory view in section, illustrating a step of finally attaching the seal tape to the roll.

To load a camera with the roll photo film 1 at first, the seal tape 6a is torn from the leader portion 4a, which is inserted in a take-up spool the same as the spool 2. Exposures are taken on the roll photo film 1 in the camera. After this, the paper-backed photo film 19 is consecutively moved by operation of the camera, and entirely wound to the periphery of the take-up spool. Then the second adhesive layer 12b of the seal tape 6b is peeled from the release layer 13. See FIGS. 6B, 6C and 6D. The seal tape 6b is attached to the outermost turn of the backing paper 4, to keep the roll of the paper-backed photo film 19 wound without looseness.

In the above embodiment, the seal tape 6b is located inside the slit 2c while the trailer portion 4b or 8b is inserted in the slit 2c. However the position of the seal tape 6b with reference to the trailer portion 4b or 8b may be changed. For example, the seal tape 6b may be located on the innermost turn of, or the second or third innermost turn of, the trailer portion 4b or 8b wound about the spool 2 while the trailer portion 4b or 8b is inserted in the slit 2c.

In the above embodiment, the seal tape 6b, when unfolded, has a length predetermined according to a length of an outermost turn of the roll. However the length of the seal tape 6b may be changed according to a position in the trailer portion 4b or 8b for attachment of the seal tape 6b with the first adhesive layer 12a. The length of the spread shape and the attaching position of the seal tape 6b can be determined in such a manner that a sum of the length of the seal tape 6b as spread and a distance from an end of the trailer portion 4b or 8b to the attaching position of the seal tape 6b is determined greater than the length of the outermost turn of the roll of the paper-backed photo film 19.

Furthermore the initial Z-shape of the seal tape 6b can be reverse to that of the above embodiment relative to the trailer portion 4b or 8b. The second adhesive layer 12b to be used for the reattachment of the end of the seal tape 6b can be located opposite to the photo filmstrip 3 with reference to the seal tape 6b. The seal tape 6b may have a small size only enough to extend in a manner crosswise to an edge of the trailer portion 4b or 8b folded back or cut back.

Furthermore the structure of the seal tape 6b of the present invention may be also used for the seal tape 6a on the leader portion 4a or 8a.

Figure 8:
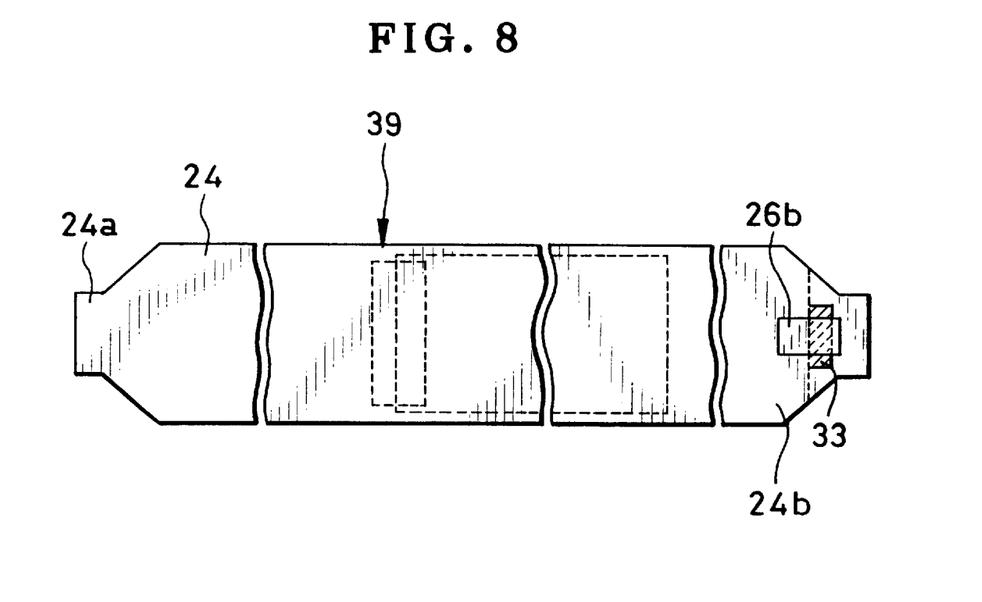
FIG. 8 is a plan illustrating another preferred roll photo film of the 120 type in a spread state and having a release layer on a trailer portion.
Figure 9:
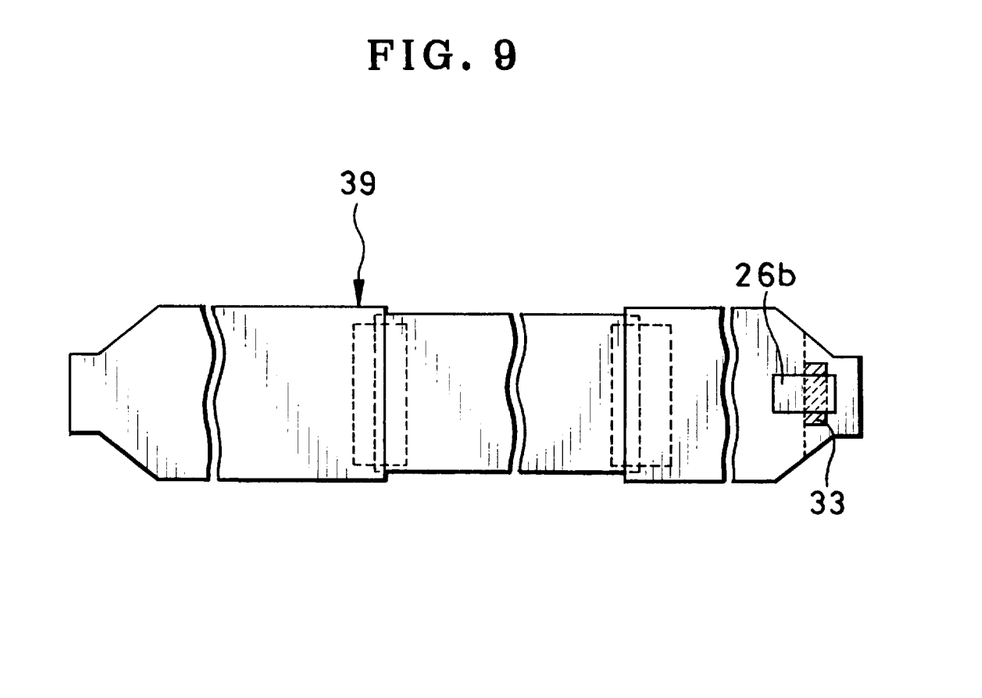
FIG. 9 is a plan illustrating a roll photo film of the 220 type with the feature the same as FIG. 8.
Figure 10:
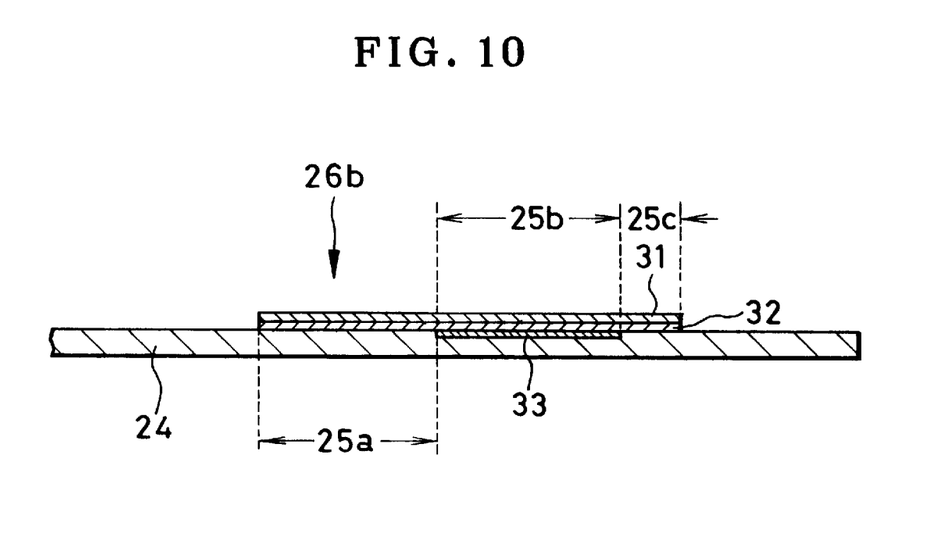
FIG. 10 is an explanatory view in section, illustrating a trailer portion with the seal tape.

In FIGS. 8, 9 and 10, another preferred roll photo film is illustrated, in which a release layer 33 is overlaid on a trailer portion 24b. In FIG. 10, a seal tape 26b is constituted by a support material 31 and an adhesive layer 32 on its back surface. The support material 31 is produced from paper or thin plastic tape. The adhesive layer 32 consists of a coating of adhesive agent applied to the support material 31. The release layer 33 is formed in a region in the trailer portion 24b of backing paper 24. The region is associated with the attachment of the adhesive layer 32, but has a range smaller than the length of the support material 31. The release layer 33 consists of a coating of silicone or the like. The seal tape 26b has a first end 25c, a second end 25a and an intermediate portion 25b. The second end 25a is secured to the trailer portion 24b of the backing paper 24 inseparably. The first end 25c is a provisionally secured end located opposite to the second end 25a. The intermediate portion 25b is positioned on the release layer 33.

Figure 11:
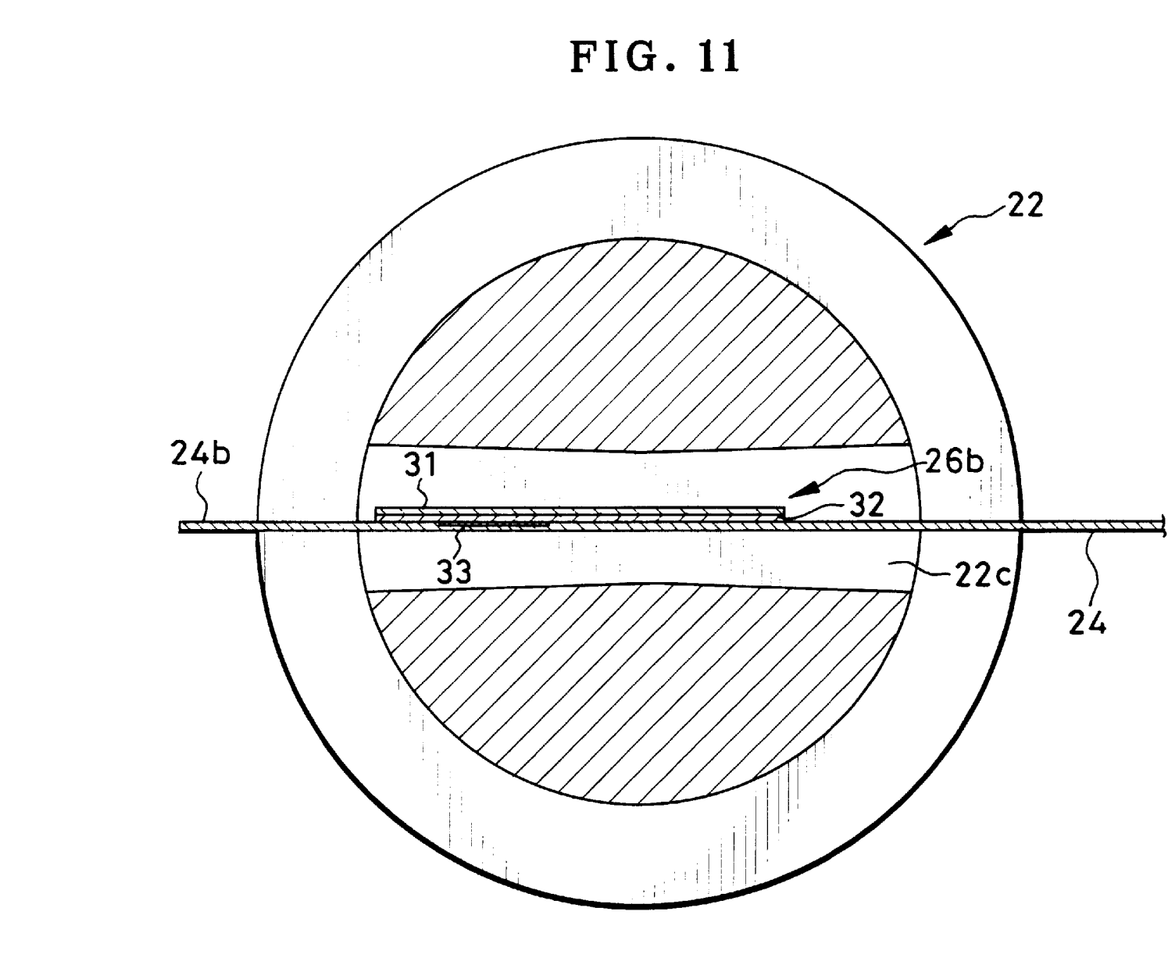
FIG. 11 is a cross section, partially cutaway, illustrating the spool and the seal tape originally positioned inside.

When the trailer portion 24b of the backing paper 24 is inserted in a slit 22c of a spool 22 in FIG. 11, the entirety of the seal tape 26b inclusive of the first end 25c is located inside the slit 22c of the spool 22.

The seal tape 26b being attached to the trailer portion 24b positioned as the innermost turn about the spool 22, both the second end 25a and the first end 25c are fixedly disposed on the trailer portion 24b along two side lines of the release layer 33. See FIG. 10. Even though the trailer portion 24b is flexed when wound about the spool 22, the release layer 33 still remains positioned on the adhesive layer 32 without being freed. There occurs no accident of sticking the end of the seal tape 26b to the back surface of the first turn of the backing paper 24.

Figure 12:
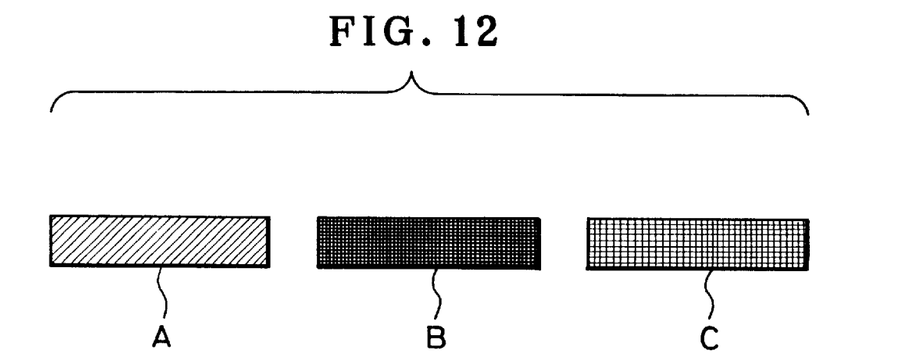
FIG. 12 is an explanatory view illustrating printing patterns of the release layer.

In FIG. 12, patterns A, B and C for printing the release layer 33 are illustrated. Density of material for the release layer 33 is different between the patterns A–C, so that the peel strength between the release layer 33 and the adhesive layer 32 of the seal tape 26b is limited in a range of 100–200 grams per 20 mm. This range of change in the peel strength is important in view of conditioning peeling between the adhesive layer 32 and the release layer 33.

Exposures are taken on the roll photo film in a camera. After this, a paper-backed photo film 39 is consecutively moved by operation of the camera, and entirely wound to the periphery of the take-up spool. The first end 25c of the seal tape 26b is forcibly peeled. The trailer portion 24b of the backing paper 24 is folded back. Thus the seal tape 26b is separated in a range to the position of the release layer 33. As the adhesive layer 32 readily operates for adhesion in the region of the intermediate portion 25b, the trailer portion 24b is attached with the seal tape 26b to a position on the outermost turn of the backing paper 24, to keep the roll of the paper-backed photo film 39 wound in the roll without looseness.

In the present embodiment, the adhesive layer consists of a tacky type, or pressure sensitive type of adhesive agent, which has a tacky characteristic constantly at the room temperature, and can be used repeatedly for adhesion after each time of peeling.

Furthermore it is possible to overlay adhesive agent of a heat-seal type on the first end 25c, and also to overlay adhesive agent of a heat-seal type on the second end 25a and the intermediate portion 25b.

In the present embodiment, the first end 25c of the seal tape 26b, which has a small size and is to be reattached, is located opposite to the photo filmstrip 3 with reference to the seal tape 26b. The seal tape 26b has such a small size that, when the photo filmstrip 3 after exposures is wound about the spool 22, the seal tape 26b only extends in a manner crosswise to the edge of the trailer portion 24b folded back or cut back.

Alternatively the position of the seal tape 26b relative to the release layer 33 may be set in reverse to that according to the above embodiment. The first end 25c, which has a small size and is to be reattached, can be positioned between the photo filmstrip 3 and the second end 25a, which has a relatively great size and is not peelable. The seal tape 26b, when extended, may have a length predetermined according to a length of an outermost turn of the roll, and may be wound about the roll.

Furthermore the structure of the seal tape 26b of the present invention may be also used for a seal tape on a leader portion 24a of the backing paper 24. See FIG. 8.

In the above embodiments, the roll photo film of the 120 type is described. Of course the roll photo film of the 220 type can be used in the present invention.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A roll photo film, including a photo filmstrip having a rear end and a front end, a light-shielding trailer portion and a light-shielding leader portion located to project respectively from said rear end and said front end, a spool on which said trailer portion is mounted, and about which said photo filmstrip is wound in a first direction to form an unexposed roll with said trailer portion and said leader portion, and a seal tape secured to said trailer portion, wherein said photo filmstrip, after being exposed, is wound in a second direction with said trailer portion and said leader portion forming an exposed roll with said leader portion internally positioned, and said seal tape being secured to said exposed roll for preventing said trailer portion from being unwound, said roll photo film comprising:

said seal tape including:
a support material having first and second end portions and an intermediate portion located therebetween;
first and second fold lines along which said support material is folded into three in a Z-shape or S-shape, said first fold line being disposed between said first end portion and said intermediate portion, and said second fold line being disposed between said second end portion and said intermediate portion;
a first adhesive layer for attaching said first end portion to said trailer portion;
an auxiliary adhesive layer for attaching said intermediate portion to said first end portion in a peelable manner;
a release layer overlaid on said intermediate portion; and
a second adhesive layer, overlaid on said second end portion, for attaching to said release layer in a peelable manner, wherein said second adhesive layer, when peeled from said release layer, sets said second end portion attachable to said trailer portion with said support material unfolded along said first and second fold lines.

2. A roll photo film as defined in claim 1, further comprising a slit formed in said spool, wherein while said photo filmstrip is unexposed, said photo filmstrip, said trailer portion and said leader portion are wound about said spool with said trailer portion inserted in said slit.

3. A roll photo film as defined in claim 2, wherein said seal tape is located inside said slit while said trailer portion is inserted in said slit.

4. A roll photo film as defined in claim 1, wherein said first end portion is disposed further from said photo filmstrip with reference to said second end portion, and said support material has a length equal to or more than a length of an outermost turn of said exposed roll when unfolded, and is wound about said exposed roll.

5. A roll photo film as defined in claim 4, wherein an end piece of said trailer portion is folded back along a line before said second end portion is attached to said trailer portion, and said line is disposed between said end piece and said first end portion.

6. A roll photo film as defined in claim 1, wherein said release layer includes silicone.

7. A roll photo film, including a photo filmstrip having a rear end and a front end, a light-shielding trailer portion, and a light-shielding leader portion located to project respectively from said rear end and said front end, a spool on which said trailer portion is mounted, and about which said photo filmstrip is wound in a first direction to form an unexposed roll with said trailer portion and said leader portion, and a seal tape secured to said trailer portion, wherein said photo filmstrip, after being exposed, is wound in a second direction with said trailer portion and said leader portion forming an exposed roll with said leader portion internally positioned, and said seal tape being secured to said exposed roll for preventing said trailer portion from being unwound, said roll photo film comprising:

a release layer overlaid on said trailer in a region close to an end of said trailer; and said seal tape including a support material having first and second end portions, and an intermediate portion located therebetween, and an adhesive layer overlaid on one face of said support material, wherein said seal tape is secured to said trailer portion by said adhesive layer with said intermediate portion mounted on said release layer, and before said seal tape is secured to said exposed roll, said intermediate portion and said second end portion are peeled from said trailer portion, adhesion between said first end portion and said trailer portion is strong enough for tight attachment therebetween, and adhesion between said second end portion and said trailer portion is strong enough for preventing peeling of said intermediate portion from said release layer during manufacture of said roll photo film.

8. A roll photo film as defined in claim 7, wherein said first end portion has a greater degree of adhesion than said second end portion.

9. A roll photo film as defined in claim 8, further comprising a slit formed in said spool, wherein said first end portion is located inside said slit while said trailer portion is inserted in said slit.

10. A roll photo film as defined in claim 8, wherein said first end portion is disposed further from said photo filmstrip with reference to said second end portion.

11. A roll photo film as defined in claim 8, wherein said release layer and said adhesive layer are secured to each other with a small peel strength of 100–200 grams per 20 mm.

12. A roll photo film as defined in claim 8, wherein said release layer further comprises a release material overlaid on said trailer in a pattern.

13. A roll photo film as defined in claim 12, wherein said pattern includes plural lines arranged substantially in parallel.

14. A roll photo film as defined in claim 12, wherein said pattern includes plural lines substantially in parallel with a first pattern direction, and plural lines substantially in parallel with a second pattern direction crosswise to said first pattern direction.

15. A roll photo film as defined in claim 8, wherein said release layer includes silicone.

16. A roll photo film comprising:

a photo filmstrip having a rear end and a front end;

a light-shielding trailer portion and a light-shielding leader portion located to project respectively from said rear end and said front end;

a spool on which said trailer portion is mounted, and about which said photo filmstrip is wound in a first direction to form an unexposed roll with said trailer portion and said leader portion; and a seal tape secured to said trailer portion with a first adhesive layer, said seal tape having a second adhesive layer, wherein said photo filmstrip, after being exposed, is wound in a second direction with said trailer portion and said leader portion forming an exposed roll with said leader portion internally positioned, and said seal tape is secured to said exposed roll by said second adhesive layer for preventing said trailer portion from being unwound.

17. A roll photo film according to claim 16, wherein said seal tape further comprises a release layer that releases said second adhesive layer to automatically secure said seal tape to said exposed roll.

18. A roll photo film according to claim 16, further comprising a slit formed in said spool, wherein while said photo filmstrip is unexposed, said photo filmstrip, said trailer portion and said leader portion are wound in said first direction about said spool with said trailer portion inserted in said slit.

19. A roll photo film according to claim 18, wherein said seal tape is located inside said slit while said trailer portion is inserted in said slit.

20. A roll photo film according to claim 17, wherein said release layer includes silicone.

21. A roll photo film according to claim 17, wherein said release layer and said second adhesive layer are secured to each other with a small peel strength of 100–200 grams per 20 mm.

22. A roll photo film according to claim 17, wherein said release layer further comprises a release material overlaid on said trailer in a pattern.

23. A roll photo film according to claim 22, wherein said pattern includes plural lines arranged substantially in parallel.

24. A roll photo film according to claim 22, wherein said pattern includes plural lines substantially in parallel with a first pattern direction, and plural lines substantially in parallel with a second pattern direction crosswise to said first pattern direction.

25. A roll photo film according to claim 16, wherein said seal tape includes a support material, said second adhesive layer disposed on said support material and a release layer disposed on said support material, wherein when said photo filmstrip is wound as said unexposed roll, said support material is folded such that said second adhesive layer contacts said release layer.

26. A roll photo film according to claim 25, wherein when said photo filmstrip is wound as said exposed roll, said support material is unfolded so that said second adhesive layer is released from said release layer.

* * * * *